United States Patent
Yamaguchi et al.

(10) Patent No.: US 7,463,969 B2
(45) Date of Patent: Dec. 9, 2008

(54) CONTROL DEVICE AND CONTROL METHOD FOR ENGINE

(75) Inventors: Kazumi Yamaguchi, Fujisawa (JP); Misao Tanaka, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 11/664,548

(22) PCT Filed: Oct. 4, 2005

(86) PCT No.: PCT/JP2005/018314

§ 371 (c)(1),
(2), (4) Date: Apr. 3, 2007

(87) PCT Pub. No.: WO2006/038599

PCT Pub. Date: Apr. 13, 2006

(65) Prior Publication Data

US 2008/0035112 A1   Feb. 14, 2008

(30) Foreign Application Priority Data

Oct. 5, 2004   (JP) .............................. 2004-292427

(51) Int. Cl.
F02D 23/00 (2006.01)
F02B 37/12 (2006.01)
F02B 33/44 (2006.01)
G06F 17/00 (2006.01)

(52) U.S. Cl. .............. 701/114; 60/602; 701/115

(58) Field of Classification Search .......... 123/434, 123/435, 436, 536, 196 R, 73 AD, 559.1; 701/101–103, 114, 115; 60/602, 608
See application file for complete search history.

(56) References Cited

U.S. PATENT DOCUMENTS

| | | | | |
|---|---|---|---|---|
| 5,103,789 A | * | 4/1992 | Hartman et al. | 123/435 |
| 5,655,366 A | * | 8/1997 | Kawamura | 60/286 |
| 5,749,339 A | * | 5/1998 | Graham et al. | 123/73 AD |
| 6,213,080 B1 | * | 4/2001 | Marsh et al. | 123/196 R |
| 6,644,095 B2 | * | 11/2003 | Van Mullekom et al. | 73/10 |
| 6,758,039 B2 | * | 7/2004 | Kuboshima et al. | 60/311 |
| 7,036,464 B2 | * | 5/2006 | Luther et al. | 123/2 |
| 2007/0174222 A1 | * | 7/2007 | Daneau et al. | 706/19 |

FOREIGN PATENT DOCUMENTS

EP   1 304 462 A2   10/2002

(Continued)

*Primary Examiner*—Willis R. Wolfe, Jr.
*Assistant Examiner*—Johnny H. Hoang
(74) *Attorney, Agent, or Firm*—McCormick, Paulding & Huber LLP

(57) ABSTRACT

An estimated quantity of soot deposited near a movable part of a variable capacity mechanism and an estimated quantity of soot burnt off therefrom are determined in advance in accordance with values of parameters (engine rotation speed or similar) that express the engine operating condition, and stored in storage means. Then actual values of the parameter are measured, and an estimated deposition quantity Sa and an estimated burn off quantity Sb corresponding to the measured values are determined from the storage means. An estimated remaining quantity of soot Kn is determined by obtaining the difference between the estimated deposition quantity and the estimated burn off quantity, and a movable vane is forcibly driven to open and close in accordance with the estimated remaining quantity Kn.

10 Claims, 6 Drawing Sheets

FOREIGN PATENT DOCUMENTS

| JP | 11-62604 | 3/1999 |
| JP | 2000-265846 | 9/2000 |
| JP | 2002-047943 | 2/2002 |
| JP | 2003-129853 | 5/2003 |
| JP | 2003-293784 | 10/2003 |

* cited by examiner

1

CONTROL DEVICE AND CONTROL METHOD FOR ENGINE

CROSS REFERENCE TO RELATED APPLICATIONS

This application is entitled to the benefit of and incorporates by reference essential subject matter disclosed in International Patent Application No. PCT/JP2005/018314 filed on Oct. 4, 2005 and Japanese Patent Application No. 2004-292427 filed Oct. 5, 2004.

TECHNICAL FIELD

The present invention relates to a control device and a control method for an engine, and more particularly to technology to prevent sticking of the movable parts of a variable capacity mechanism in an engine fitted with a variable capacity turbocharger.

BACKGROUND OF THE INVENTION

Engines fitted with variable capacity turbochargers having a variable capacity mechanism are conventionally known. Variable capacity mechanisms include movable vanes, and by opening and closing these movable vanes the effective area of the flow channel within the exhaust gas turbine is increased and decreased. The movable vanes are controlled to open so that the effective area of the flow channel becomes large in the high rotation speed high load region when the flow rate of exhaust gas is large, and in this way an excessive rise in back pressure in the engine is suppressed. Also, the movable vanes are controlled to close so that the effective area of the flow channel becomes small in the low rotation speed low load region when the flow rate of exhaust gas is small, and in this way sufficient supercharging pressure can be obtained even in the low rotation speed low load region.

On the other hand, when the engine has been used for a long time, soot and the like is deposited near the movable parts of the variable capacity mechanism, and in some cases the movable parts can stick and become unable to move. Therefore, it is known that at predetermined timing, the movable vanes are forcibly opened and closed, to prevent the deposition of soot and the like as well as sticking of the movable parts. In Patent Document 1, the forcible opening and closing of the movable vanes in operating regions that will not directly affect the running of a vehicle, such as idling, is disclosed. Patent Document 2 discloses a method for determining a fault in the variable capacity mechanism.

Patent Document 1: Japanese Patent Application Laid-open No. 2000-265846
Patent Document 2: Japanese Patent Application Laid-open No. H11-62604

SUMMARY OF THE INVENTION

The deposition of soot and the like as referred to above can easily occur during low speed low load operation of an engine. In the case of vehicle engines or similar, this can easily occur in a vehicle continuously running at low speed in mainly city areas or similar, and in cases in which the degree of opening of the movable vanes is kept small, such as in traffic congestion, idling while parking, warming up, and so on.

For meanwhile, in the device according to Patent Document 1, the frequency of use of the movable vanes prior to the forcible driving is focused and forcible driving is controlled based on the premise that soot accumulates in the region in which the frequency of use of the movable vanes is low. In other words, if the movable vanes are frequently used in the open direction during normal engine operation, it is assumed that soot will be deposited on the closure side, and the movable vanes are forcibly opened and closed on the closure side only. Conversely, if the movable vanes are frequently used on the closure side, it is assumed that soot is deposited on the open side, and the movable vanes are forcibly opened and closed on the open side only. In this way, the opening and closing strokes of the movable vanes during forcible driving are set to the ranges center to fully open or fully closed to center (see the embodiment in FIG. 7 of Patent Document 1).

However, the movable vanes are frequently used in the open direction when an engine is mainly operated in the high rotation speed high load region. At this time high temperature and high flow rate exhaust gas is supplied to near the movable parts of the variable capacity mechanism, so it is considered that either soot does not deposit, or deposited soot is burnt off. In the device according to Patent Document 1, this burning off is not considered, and the control is carried out unrelated to the burning off, which may result in excessive control. For vehicles that are used frequently at high speeds, if the vehicle subsequently idles the forcible driving will have been carried out wastefully.

Also, in the device according to Patent Document 1, it is possible to select the movable vane opening and closing stroke to be one of either center to fully open or fully closed to center, and it is not possible to change the number of opening and closing movements in accordance with the operating conditions prior to the forcible driving. Therefore, when the same forcible drive control setting is carried out for many vehicles that have diverse usage patterns, it is necessary to set the number of opening and closing movements to suit vehicles that are frequently driven at low speed for which soot is deposited most easily, and this has the disadvantage that an excessive number of opening and closing movements are carried out for vehicles that are frequently driven at high speed.

Therefore, the present invention newly focuses on the reality of deposition and burn off of soot as described above, and an object of the present invention is to provide a control device and a control method for an engine, capable of executing appropriate movable vane forcible drive control in accordance with the actual engine operating conditions.

According to a first aspect of the present invention, a control device for an engine having a turbocharger with a variable capacity mechanism that includes a movable vane is provided, comprising: first storage means that stores the quantity of soot estimated to be deposited near a movable part of the variable capacity mechanism, determined in advance in accordance with a value of a parameter expressing an engine operating condition; second storage means that stores the quantity of soot estimated to be burnt off from near the movable part, determined in advance in accordance with the value of the parameter; measurement means that measures an actual value of the parameter; first determination means that determines an estimated deposition quantity and an estimated burn off quantity of soot corresponding to the measured values of the parameter, from the first storage means and the second storage means; second determination means that determines an estimated remaining quantity of soot by obtaining the difference between the determined estimated deposition quantity and the determined estimated burn off quantity; and drive means that forcibly drives the movable vane to open and close in accordance with the determined estimated remaining quantity.

Preferably the parameter is composed of at least one of an engine rotation speed, an engine load, and an engine temperature.

When the parameter is composed of an engine rotation speed, preferably the estimated deposition quantity becomes smaller as the engine rotation speed increases, and the estimated burn off quantity becomes larger as the engine rotation speed increases.

When the parameter is composed of an engine load, preferably the estimated deposition quantity becomes smaller as the engine load increases, and the estimated burn off quantity becomes larger as the engine load increases.

When the parameter is composed of an engine temperature, preferably the estimated deposition quantity becomes smaller as the engine temperature increases, and the estimated burn off quantity becomes larger as the engine temperature increases.

Preferably comparison means that compares the estimated remaining quantity with a predetermined threshold value is further provided, and when the estimated remaining quantity is greater than the predetermined value, the drive means forcibly drives the movable vane for a period of time corresponding to the estimated remaining quantity.

Preferably the drive means executes forcible driving of the movable vane with a pattern of moving the movable vane in an open direction and a closure direction at least once each, as one drive.

Preferably the estimated deposition quantity, the estimated burn off quantity, and the estimated remaining quantity have the units of number of times of the forcible driving.

Preferably the drive means comprises third determination means that determines a target degree of opening of the movable vane, and the determined target degree of opening has a value corresponding to a waveform that is obtained after applying a rounding process to a rectangular wave with respect to a time axis.

Preferably the drive means executes the forcible driving when the engine operating condition is in an idling region.

According to a second aspect of the present invention, an engine control method for an engine having a turbocharger with a variable capacity mechanism that includes a movable vane is provided, comprising: a step of determining in advance a quantity of soot estimated to be deposited near a moving part of the variable capacity mechanism, in accordance with a value of a parameter that expresses an engine operating condition; a step of determining in advance a quantity of soot estimated to be burnt off from near the moving part in accordance with the value of the parameter; and a step of storing in storage means the estimated deposition quantity and the estimated burn off quantity of soot, each in association with the values of the parameter.

Preferably a step of measuring an actual value of the parameter; a step of determining an estimated deposition quantity and an estimated burn off quantity of soot corresponding to the measured values of the parameter, from the storage means; a step of determining an estimated remaining quantity of soot based on the determined estimated deposition quantity and the determined estimated burn off quantity; and a step of forcibly driving the movable vane to open and close for a period of time corresponding to the determined estimated remaining quantity are further provided.

According to the present invention, the superior effect that it is possible to execute suitable movable vanes forcible drive control appropriate for the actual engine operating conditions can be obtained.

BEST MODE FOR CARRYING OUT THE INVENTION

The following is a detailed description of the best mode for carrying out the invention based on the attached drawings.

Figure 1:
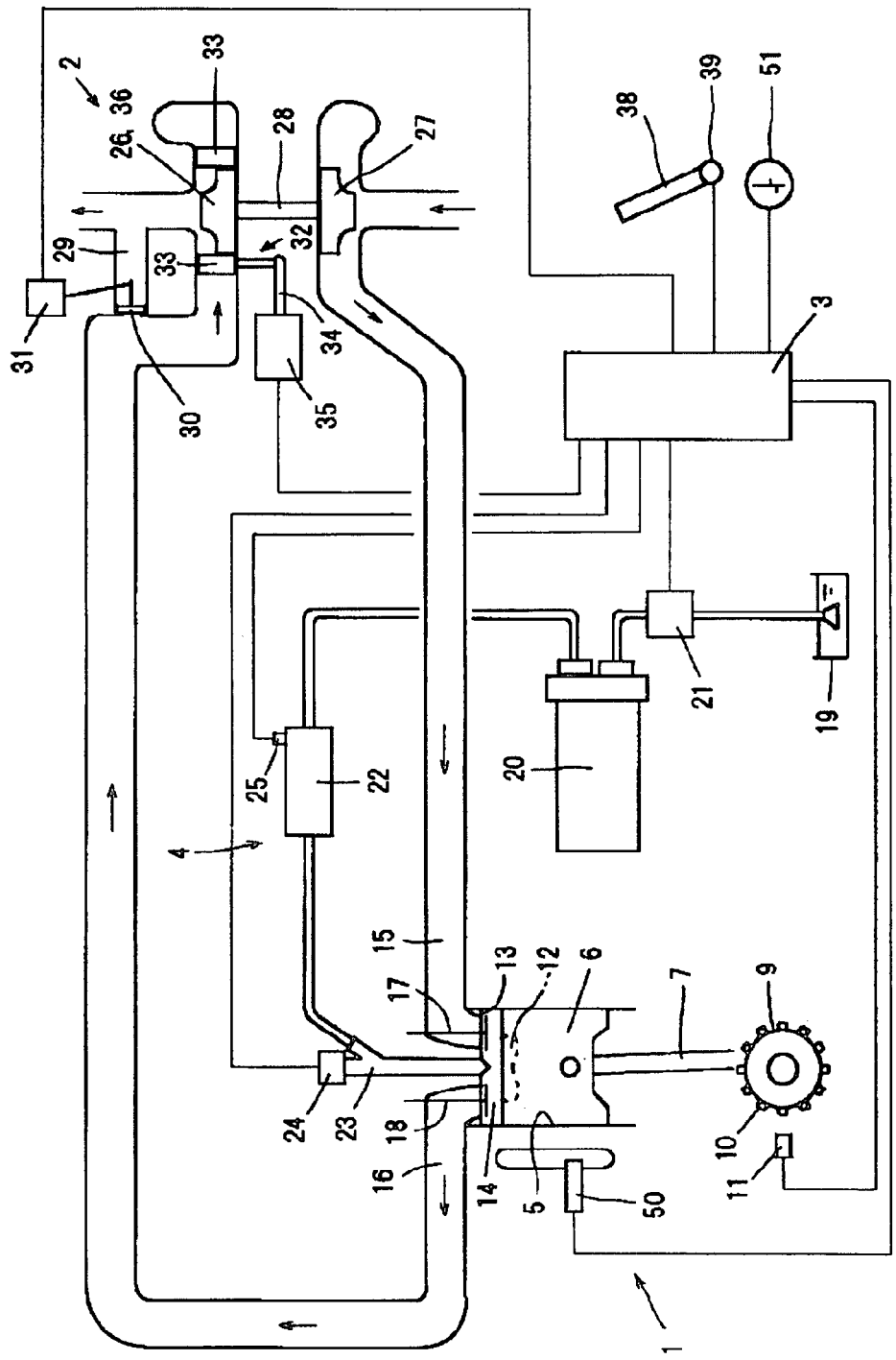
FIG. 1 is a system diagram showing the engine control device according to an embodiment of the present invention.

FIG. 1 shows a control device for an engine according to the present embodiment. An engine 1 according to the present embodiment is a vehicle diesel engine that includes a variable capacity turbocharger 2 that is controlled by an electronic control unit (hereafter referred to as ECU) 3. Also, the engine 1 is a multi-cylinder engine (only one cylinder is shown in the drawings), having a common rail type fuel injection device 4.

The engine 1 includes a plurality of cylinders 5, and pistons 6 are disposed within each cylinder 5. Each piston 6 is connected to a crankshaft via a connecting rod 7. A signal rotor 9 is installed on the crankshaft, and projections 10 are provided at equal spacing on the outer peripheral surface of the signal rotor 9. A crank angle sensor 11 is fixed in opposition to the projections 10, and every time a projection 10 passes the crank angle sensor 11, a pulse signal is output to the ECU 3. Based on the pulse signal, the ECU 3 detects the crankshaft phase, in other words the crank angle θcr, and calculates the engine rotation speed NE.

A concave piston combustion chamber 12 is formed in compartments in the top of the piston 6. A cylinder combustion chamber 14 is formed in compartments from the piston combustion chamber 12, the top surface of the piston 6, the cylinder 5, and a cylinder head 13. An air inlet channel 15 and an exhaust channel 16 are opened into the combustion chamber 14, and the air inlet channel 15 and the exhaust channel 16 are opened and closed by an air inlet valve 17 and an exhaust valve 18 respectively.

The common rail type fuel injection device 4 includes a high pressure supply pump 20 that draws in fuel from a fuel tank 19 and discharges the fuel at high pressure, a volume adjustment valve 21 that controls the quantity of fuel drawn in to the high pressure supply pump 20 in order to control the quantity of fuel discharged from the high pressure supply pump 20, a common rail 22 that stores fuel discharged from the high pressure supply pump 20 at high pressure, and an injector 23 installed in the cylinder head 13 to which fuel is constantly supplied from the common rail 22. The high pressure supply pump 20 is driven by the engine 1.

The injector 23 is provided with an electromagnetic actuator 24, and the electromagnetic actuator 24 is turned ON and OFF by the ECU 3, so that the injector 23 is controlled to inject fuel or stop. A plurality of injection holes provided in the bottom end of the injector 23 is disposed within the combustion chamber 14 near the cylinder axis center, and when fuel is injected, fuel is injected radially from each injection hole into the piston combustion chamber 12.

The output signal from a common rail pressure sensor 25 provided on the common rail 22 is sent to the ECU 3, to measure the pressure of the fuel within the common rail, in other words the common rail pressure. The degree of opening of the volume adjustment valve 21 is controlled by the ECU 3, and in this way the fuel supply quantity from the high pressure supply pump 20 to the common rail 22 is controlled, so the common rail pressure is controlled. The ECU 3 calculates the target common rail pressure according to the present engine operating conditions, and controls the degree of opening of the volume adjustment valve 21 so that the actual common rail pressure measured by the common rail sensor 25 approaches the target common rail pressure. As a result, feedback control of the common rail pressure is preformed.

The turbocharger 2 includes an exhaust gas turbine 26 provided in the exhaust channel 16, a compressor 27 provided in the air inlet channel 15, and a turbine shaft 28 that connects the exhaust gas turbine 26 and the compressor 27, the exhaust gas turbine 26 is driven by exhaust gas supplied thereto, and the compressor 27 is driven thereby, and the inlet air pressure is raised by the compressor 27 to a supercharge pressure appropriate to the engine operating conditions.

A bypass channel 29 that bypasses the exhaust gas turbine 26 is provided in the exhaust gas channel 16, and a wastegate valve 30 is provided in the bypass channel 29. When the supercharge pressure exceeds a predetermined value, the wastegate valve 30 is opened, to prevent excessive rotation of the exhaust gas turbine 26. An actuator 31 is connected to the wastegate valve 30, and the opening and closing of the wastegate valve 30 are controlled by controlling the actuator 31 with the ECU 3.

Figure 2:
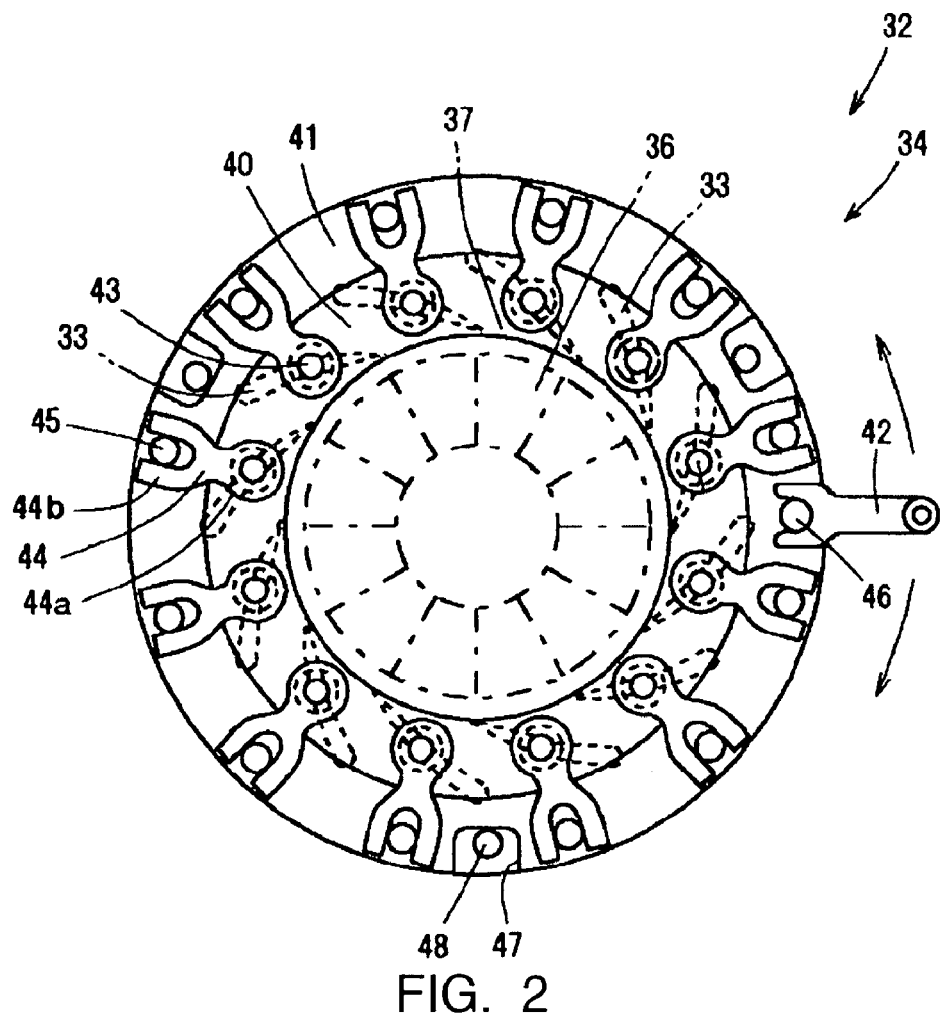
FIG. 2 is a schematic diagram showing the variable capacity mechanism.

A variable capacity mechanism 32 is provided in the exhaust gas turbine 26 of the turbocharger 2 to vary the capacity or the effective area of the flow channel. As shown in FIG. 2, the variable capacity mechanism 32 includes a plurality of movable vanes 33, an opening and closing mechanism 34 connected to the movable vanes 33 to open and close the movable vanes 33 at the same time, and an actuator 35 connected to the opening and closing mechanism 34 to apply the opening and closing driving force to the opening and closing mechanism 34.

In the present embodiment, the movable vanes 33 are positioned just before the upstream of a turbine wheel 36 of the exhaust gas turbine 26, and compartmentalize a nozzle 37 that is the exit for exhaust gas that is to be provided to the turbine wheel 36. By varying the vane angle, the direction and size (area) of the nozzle 37 is varied. The ECU 3 normally determines the target degree of opening of the movable vanes in accordance with the engine operating conditions, controls the actuator 35 in accordance with the value of the target degree of opening, and controls so that the actual degree of opening of the movable vanes coincides with the target degree of opening. When the engine operating conditions are low rotation speed and low load, the movable vanes 33 are controlled to the closed side so that the nozzle area becomes smaller, and conversely when the engine operating conditions are high rotation speed and high load, the movable vanes 33 are controlled to the open side so that the nozzle area becomes larger.

An accelerator degree of opening sensor 39 that measures the amount of depression of an accelerator pedal 38, in other words the accelerator degree of opening angle θth, is connected to the ECU 3. The ECU 3 determines the current engine load based on the accelerator degree of opening angle θth. The ECU 3 is connected to a water temperature sensor 50 that measures the engine water temperature Tw as the engine temperature, and a key switch 51 that switches the electrical power ON and OFF to the overall control device.

The ECU 3 controls the fuel injection quantity and the injection timing based on the engine operating conditions. In other words, the ECU 3 calculates and determines the fuel target injection quantity Qtar and the target injection timing Ttar mainly from the engine rotation speed NE and the accelerator degree of opening angle θth, and controls the electromagnetic actuator 24 of the injector 23 ON and OFF so that the actual fuel injection quantity and injection timing coincide with the fuel target injection quantity Qtar and the target injection timing Ttar.

As shown in FIG. 2, the opening and closing mechanism 34 of the variable capacity mechanism 32 includes a ring shaped plate 40 that is fixed to the turbine housing and forms a part of the exhaust gas flow channel, a drive ring 41 that is located outside the flow channel, and formed in a ring shape whose diameter is larger than the diameter of the ring shaped plate 40, and a drive arm 42 that engages with the drive ring 41 and drives the drive ring 41 to rotate in the directions shown by the arrows. A plurality of vane drive shafts 43 are rotatably inserted into and supported by the ring shaped plate 40, and the movable vanes 33 are fixed to a tip of the vane drive shafts 43. In this way, when the vane drive shafts 43 rotate, the movable vanes 33 also rotate to open and close. At this time, the movable vanes 33 either slide on the internal walls of the flow channel in both the near side and the far side in the thickness direction of the paper surface, or small gaps are formed with the internal walls of the flow channel.

The vane drive shafts 43 and the drive ring 41 are connected by a plurality of Y-shaped arm members 44. Each of the base end portions 44a of the arm members 44 are fixed to the vane drive shafts 43. On the other hand, a plurality of pins 45 is fixed to the drive ring 41, and the forked portion 44b of the arm members 44 engages with the pins 45 by sandwiching the pins 45. When the drive ring 41 rotates about the center of the turbine as shown by the arrows, all the pins 45 rotate at the same time, so all the arm members 44 are driven to rotate about the center of the vane drive shafts 43. In this way, all the vane drive shafts 43 and the movable vanes 33 are driven to rotate about the center of the vane drive shafts 43, so the degree of opening or the angle of the movable vanes 33 changes concurrently.

The drive ring 41 is rotated by driving the drive arm 42 by the actuator 35. The end of the drive arm 42 is formed in a Y-shape, and a pin 46 fixed to the drive ring 41 is sandwiched between and mated to this Y-shape. The base end of the drive arm 42 is connected to the actuator 35. To limit the rotation angle of the drive ring 41, in other words the degree of opening of the movable vanes 33, within a predetermined range, a plurality of stopper pins 48 fixed to the fixed side of the turbine housing or similar is disposed within a plurality of notches 47 in the drive ring 41 respectively.

In cases in which a vehicle continuously runs at low speed in a city or in similar conditions in which the movable vanes 33 are maintained at a relatively small degree of opening, soot or similar in the exhaust gas deposits near the movable parts of the variable capacity mechanism 32, so that faults such as the sticking of the movable vanes 33 can occur. Typical soot deposition locations that can cause this type of sticking include the sliding portion or gap between the movable vanes 33 and the internal walls of the exhaust gas flow channel, as well as between the vane drive shafts 43 and the insertion holes in the ring shaped plate 40 in which the vane drive shafts 43 are inserted and supported. If this type of sticking fault occurs, the movable vanes 33 may not be able to be controlled to the required degree of opening.

Therefore, to prevent this in advance, it is desirable to forcibly open and close the movable vanes 33 at appropriate timing, out of the normal control. By doing this, it is possible to prevent the accumulation of soot itself near the movable parts, and even if soot has deposited it is possible to shake the soot off and remove the soot before the soot adheres.

The following is an explanation of the control of forcible opening and closing of the movable vanes according to the present embodiment.

Figure 3:
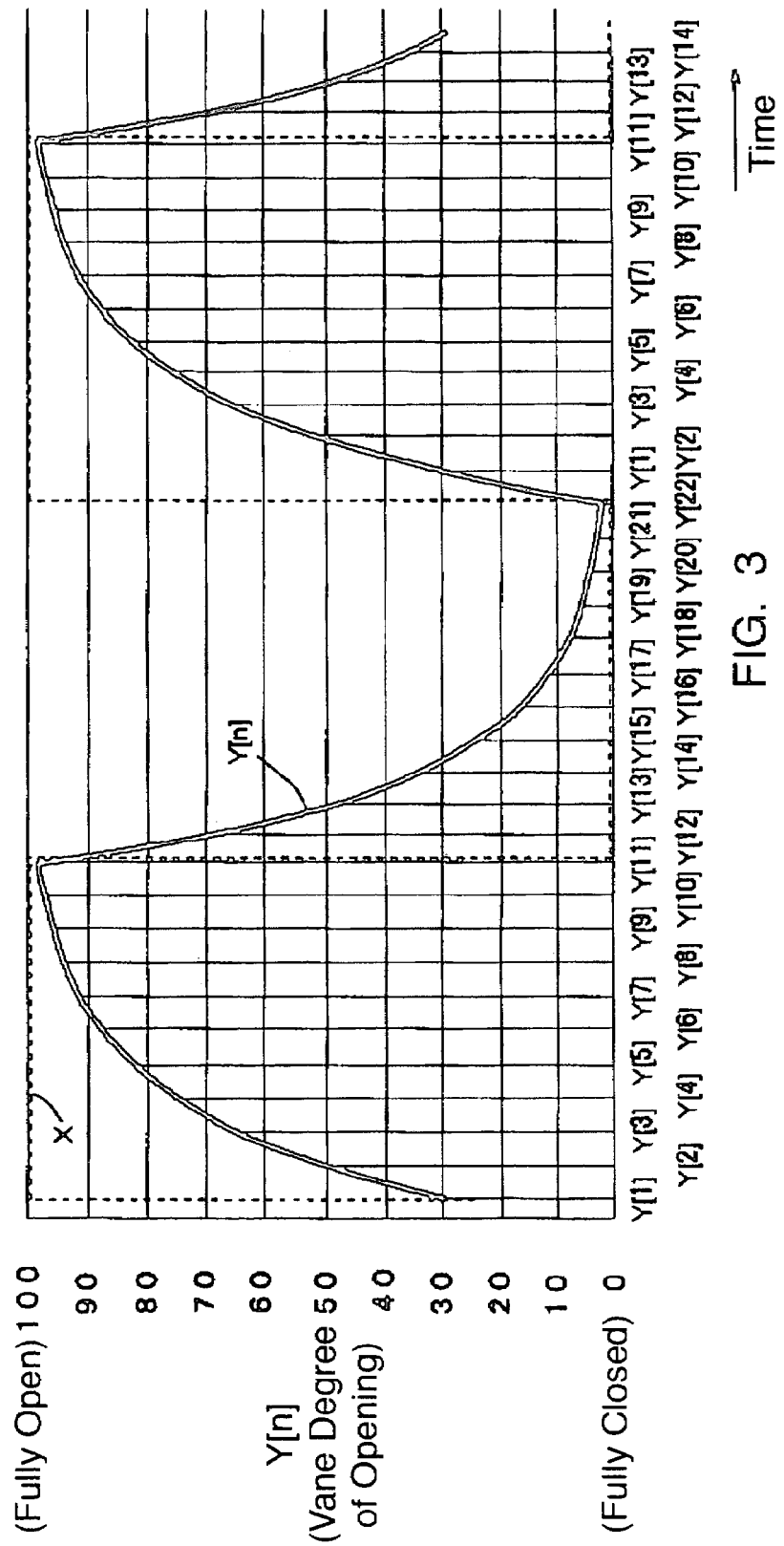
FIG. 3 is a graph showing the variation in degree of opening of the movable vanes during the forced movement control.

First, an outline of the opening and closing movement of the movable vanes 33 is explained in accordance with FIG. 3. On the figure, the horizontal axis is time, and the vertical axis is the degree of opening of the movable vanes 33. As can be understood from the figure, the movable vanes are operated in the open direction, closed direction, open direction, . . . . The movable vanes may be instantaneously fully opened and fully closed as the rectangular wave indicated by X, but this is not desirable as the engine operating condition suddenly changes, so in the present embodiment, the movable vanes are moved gently in the open direction and in the closed direction as the rounded rectangular wave indicated by Y[n]. This will be explained in detail later. The opening and closing movement is carried out between a degree of opening near fully closed and a degree of opening near fully open, but the range of degrees of opening may be set arbitrarily as necessary.

Stated differently, FIG. 3 shows the variation in the target degree of opening of the movable vanes 33 determined by the ECU 3. The movable vanes are controlled so that the actual degree of opening coincides with this target degree of opening. The horizontal axis is time, and the vertical axis is the value Y[n] of the target degree of opening signal output from the ECU 3, in other words in the control according to the present embodiment a target degree of opening signal having a predetermined value is output from the ECU 3 to the actuator 35 for a fixed time period. The movable vanes move from fully closed to fully open in accordance with the values of target degree of opening 0 to 100. A voltage or current whose magnitude corresponds to the value of target degree of opening is output from the ECU 3 to the actuator 35, so the actuator 35 and therefore the position of the movable vanes 33 is controlled.

Y[1], Y[2], . . . on the horizontal axis indicate the timing that the target degree of openings Y[1], Y[2], . . . are output at each control time n=1, 2, . . . , and the values of the target degree of openings are Y[1]=30, Y[2]=51, . . . . One time of the forcible driving is completed by outputting Y[1] to Y[22], and during that one time of forcible driving, the movable vanes are moved once each in the open direction, and in the closed direction. The figure shows an example of carrying out the forcible driving about twice, with Y[1] to Y[22] being output about twice.

Next, the method of calculating the estimated remaining quantity of soot near the movable parts of the variable capacity mechanism is explained. This calculation is carried out by the ECU 3 executing the estimated remaining quantity calculation routine shown in FIG. 4 every predetermined sample time (for example, one minute).

This routine is started at the same time that the key switch 51 of the engine is turned ON by the driver. In the first step 101, the ECU 3 loads the previous estimated remaining quantity Kn−1. The previous estimated remaining quantity Kn−1 is a value stored in a writable memory (EPROM or similar) within the ECU 3, and when first executed after turning the ignition switch ON, the value is the one stored while the key switch was formerly OFF and this will become clear in the following. During the normal operation of the engine, the value is the one stored during the previous (in other words, one minute before) control.

Figure 7:
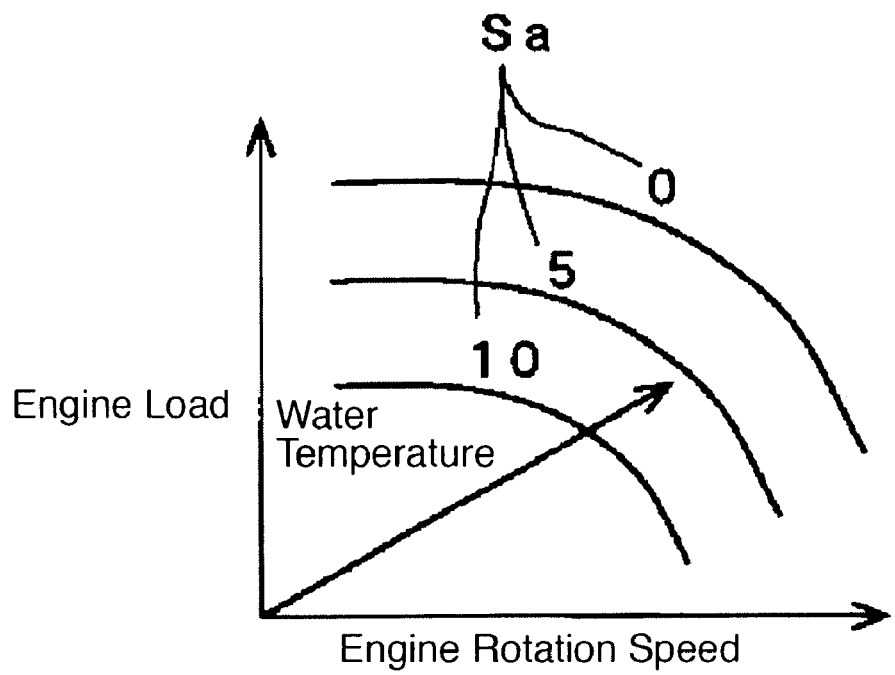
FIG. 7 is an estimated deposition quantity calculation map.
Figure 9:
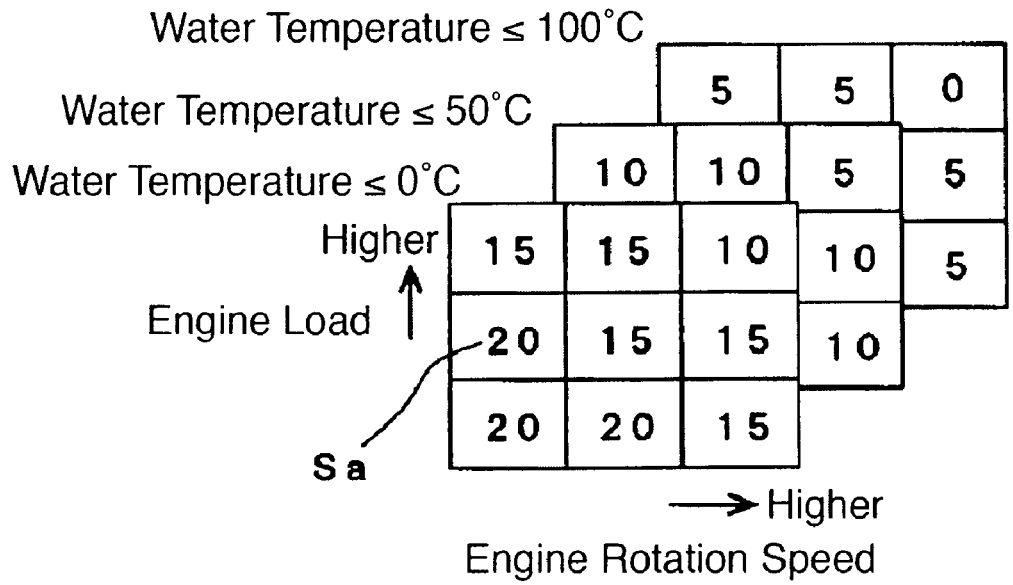
FIG. 9 is a specifically drawn map according to the estimated deposition quantity calculation map of FIG. 7.

Next, in step 102, the ECU 3 determines the estimated deposition quantity Sa of soot from the estimated deposition quantity calculation map M1 shown in FIG. 7 and FIG. 9. This map M1 is stored in read only memory (ROM or the like) within the ECU 3. As shown in FIG. 7, the map M1 stores the estimated deposition quantity Sa of soot that is determined in advance in accordance with the values of parameters expressing the engine operating conditions. In the case of the present embodiment, these parameters are the engine rotation speed NE, the engine load L, and the engine water temperature Tw, and a single estimated deposition quantity Sa corresponding to the value of these three parameters is determined. The estimated deposition quantity Sa is the estimated quantity of soot deposited near the normal movable parts during the sample time (one minute) under particular engine operating conditions, and the values of which are determined based on actual engine tests or similar.

FIG. 9 shows the map M1 more specifically. As can be seen from this figure, the value of the estimated deposition quantity Sa becomes smaller as the engine rotation speed Ne increases, and becomes smaller as the engine load L increases. Also in the present embodiment, the value of the estimated deposition quantity Sa is set in units of number of times of forcible driving(in other words, not in common units for quantity such as cc or similar). For example, an estimated deposition quantity Sa=20 as shown in the figure means a quantity of soot that is removed from near the movable parts by executing the forcible driving 20 times.

In the present embodiment, a plurality of maps M1 is provided, each for a predetermined water temperature range. In the present embodiment, three maps M1 are prepared in advance and stored in the ECU, for the water temperature Tw less than or equal to a first threshold value Tw1 (Tw≦Tw1), for the water temperature Tw greater than the first threshold value Tw1 and less than or equal to a second threshold value Tw2 (Tw1<Tw≦Tw2), and for the water temperature Tw greater than the second threshold value Tw2 and less than or equal to a third threshold value Tw3 (Tw2<Tw≦Tw3). In the present embodiment, Tw1=0° C., Tw2=50° C., and Tw3=100° C. As can be seen in the figure, the value of the estimated deposition quantity Sa becomes smaller as the engine water temperature Tw becomes higher.

Figure 8:
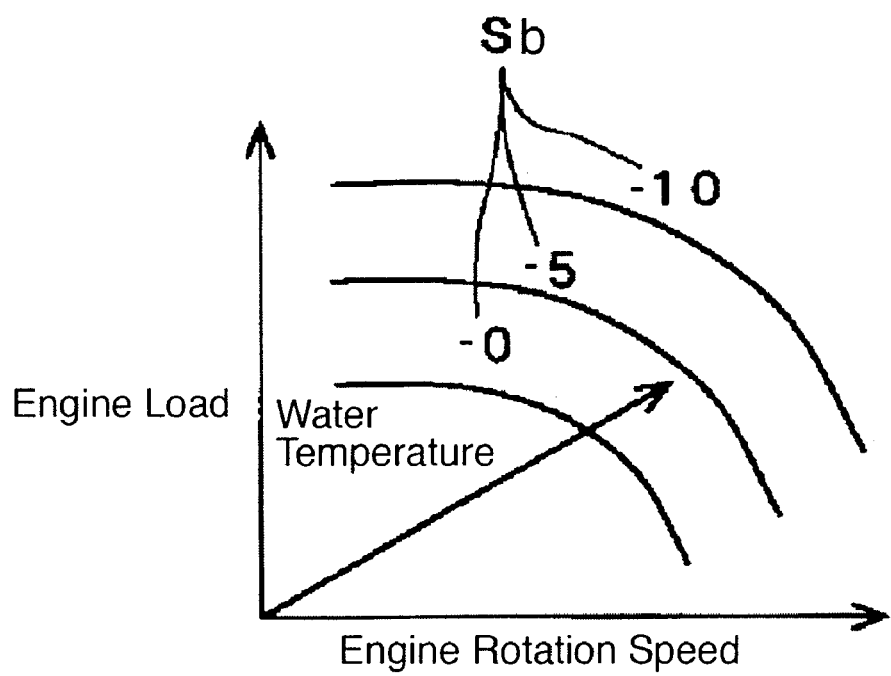
FIG. 8 is an estimated burn off quantity calculation map.
Figure 10:
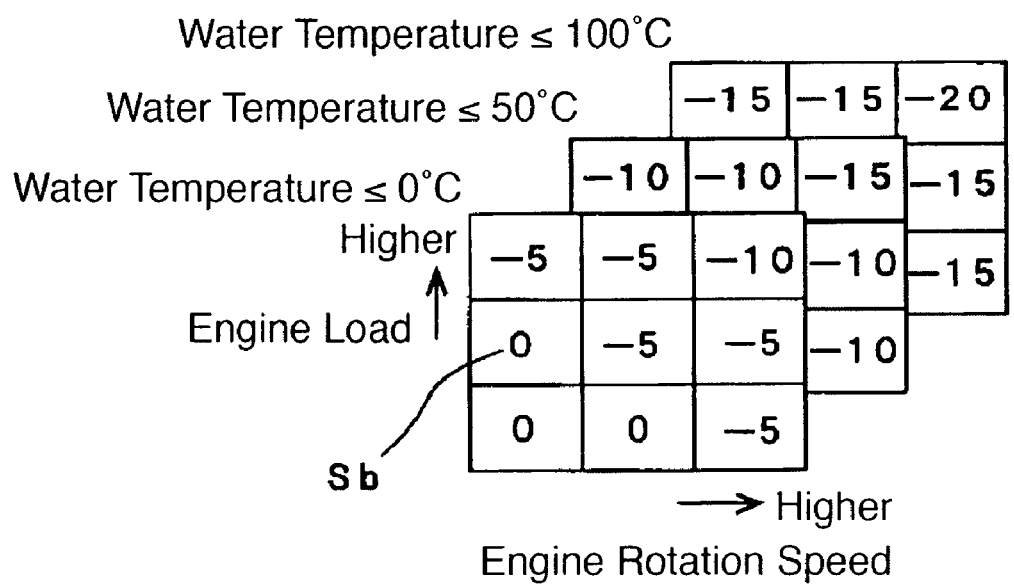
FIG. 10 is a specifically drawn map according to the estimated burn off quantity calculation map of FIG. 8.

Returning to FIG. 4, in the next step 103, the ECU 3 determines the estimated burn off quantity Sb of soot from the maps M2 for calculation of the estimated burn off quantity shown in FIG. 8 and FIG. 10. The maps M2 are also stored in read only memory (ROM or similar) within the ECU 3, same as the maps M1, and store the estimated burn off quantity of soot Sb determined in advance in accordance with the values of the parameters (engine rotation speed NE, engine load L, and engine water temperature Tw). The estimated burn off quantity Sb is the estimated quantity of soot burned off normally from near the movable parts in the sample period (one minute) under particular engine operating conditions. Also, the value of the estimated burn off quantity Sb is set in units of number of times of forcible driving, and three maps M2 are provided, one for each water temperature range as described before.

As shown in FIG. 8 and FIG. 10, the input values of the maps M2 differ from those of the maps M1, and the maps M2 have the opposite relationship with the maps M1. As can be seen from the figures, either zero or negative values are input to the maps M2. This is to deduct from the estimated deposition quantity Sa, and substantially has the meaning in the absolute value of the input values in the maps M2, as will be understood later. The absolute value of the input values in the maps M2 become larger as the engine rotation speed NE increases, become larger as the engine load L increases, and become larger as the engine water temperature Tw becomes higher.

In this way, the present invention is based on the concept that the higher the engine rotation speed, and the higher the engine load, and the higher the engine water temperature, the smaller the quantity of soot deposition, and the greater the quantity of soot burnt off. It is considered that the higher the engine rotation speed and the higher the engine load, exhaust gas at high temperature and high flow rate blows to the movable parts of the variable capacity mechanism so soot deposition is small and more soot is burned off, and moreover, it is considered that under these engine operating conditions the movable vanes are more frequently moved compared with when the rotation speed and load are low, so it is considered that soot does not deposit, and deposited soot is shaken off. Further, the higher the engine water temperature, the higher the exhaust gas temperature, it may be considered that the deposition is small as it is difficult for soot to deposit near the movable parts.

Conversely, it may be considered that the lower the engine rotation speed, the lower the engine load, and the lower the engine water temperature, the greater the soot deposition and the less soot is burned off. Therefore, the remaining quantity is determined by obtaining the difference in the deposition quantity and the burnt off quantity, and it is possible to achieve appropriate and sufficient forcible driving by carrying out the forcible driving only for the time, in other words the number of times, corresponding to this remaining quantity.

Returning to FIG. 4, in step 104, the ECU 3 uses the operational expression $$Kn = Kn-1 + Sa + Sb$$

to determine the current estimated remaining quantity of soot Kn. The estimated burn off quantity Sb obtained from the map M2 has a negative sign so the estimated burn off quantity Sb is added to the estimated deposition quantity Sa, but it is substantially equivalent to deducting the estimated burn off quantity Sb from the estimated deposition quantity Sa. The previous estimated remaining quantity of soot Kn−1 is added to this difference, and their sum of the estimated remaining quantity Kn is calculated cumulatively. The current soot estimated remaining quantity Kn determined in this way is updated and stored into the writable memory within the ECU 3.

Then, in step 105, the ECU 3 updates and stores the previous estimated remaining quantity Kn−1 in the writable memory of the ECU 3 as a value equal to the current estimated remaining quantity of soot Kn. In the next step 106, it is determined whether the driver has turned the key switch 51 OFF or not. As the key switch 51 is not turned OFF during normal operation, the procedure returns to step 101 in this case, and after the sample time has passed, steps 101 to 104 will be executed again. This repeating loop of steps 101 to 104 is executed every sample time, and the estimated remaining quantity Kn is updated every sample time.

On the other hand, if, in step 106, the key switch 51 is turned OFF in accordance with the engine stopped, the routine is terminated.

Figure 5:
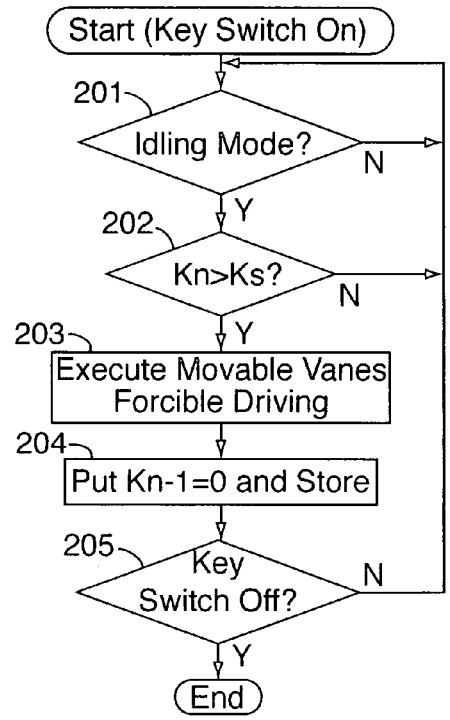
FIG. 5 is a flowchart showing the forced movement execution determination routine.

Next, the method of determining the execution of the forcible driving is explained. This procedure determines whether it is time to carry out a forcible driving or not, and the forcible driving execution determination routine shown in FIG. 5 is executed by the ECU 3 at predetermined sample times (for example one minute).

Same as the previous routine, this routine also starts at the same time that the engine key switch 51 is turned ON by the driver. In the first step 201, the ECU 3 determines whether the current engine control mode is the idling mode or not. When the engine control mode is in the idling mode, the engine operating conditions are in the idling region, specifically when, (1) the actual measured engine rotation speed NE is a value near a predetermined idling rotation speed (for example, 500 rpm), and (2) the measured accelerator degree of opening θth is zero (in other words, the amount that the accelerator pedal 38 is depressed is zero).

Figure 4:
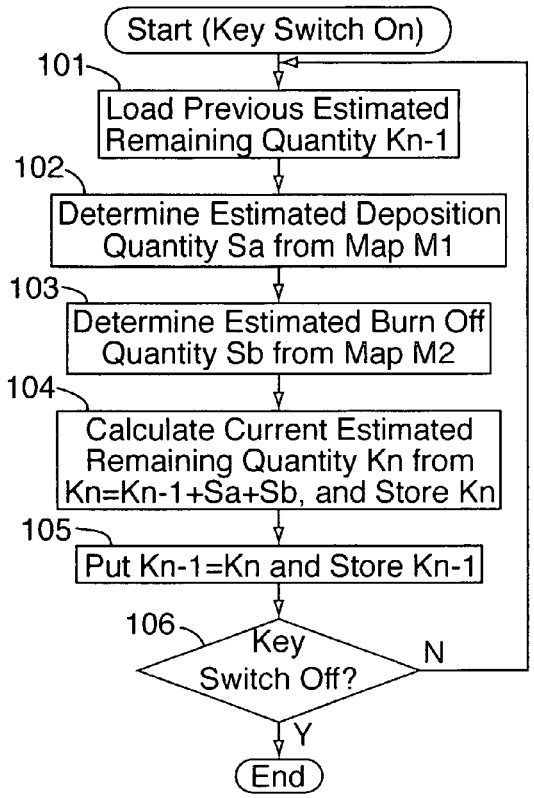
FIG. 4 is a flowchart showing the forced movement number of times calculation routine.

When the engine control mode is the idling mode, the control routine proceeds to step 202, and the estimated remaining quantity Kn determined in step 104 in FIG. 4 is compared with a threshold value (forcible driving execution determination threshold) Ks. In the present embodiment, Ks=3. If the estimated remaining quantity Kn is greater than the threshold value Ks, the control routine proceeds to step 203, and the forcible driving of the movable vanes is executed at this point. This is carried out by executing the forcible driving execution routine shown in FIG. 6.

Next, the control routine proceeds to step 204, the previous estimated remaining quantity Kn−1 is set to zero and stored in the memory within the ECU 3. This is because the soot is considered to have been removed by executing the forcible driving, so it is necessary to set the previous estimated remaining quantity Kn−1 calculated in step 104 of FIG. 4 to zero.

Then, the control routine proceeds to step 205, and it is determined whether the key switch 51 is turned OFF or not. As the key switch 51 is not turned OFF during normal operation, the routine returns to step 201. Then after the sample time has passed, the next control starts from step 201. On the other hand, in the present control, when the control mode is not the idling mode (NO in step 201), or when the estimated remaining quantity Kn is equal to or less than the threshold value Ks(NO in step 202), the routine returns to step 201, and the next control starts from step 201. In this way, the forcible driving execution determination is repeatedly carried out every sample time, and when necessary the movable vane forcible driving is carried out.

In step 204, if the key switch 51 is turned OFF, the forcible driving execution determination routine is terminated.

Next, the method of executing the movable vane forcible driving is explained. This execution is carried out by the ECU 3 executing the forcible driving execution routine shown in FIG. 6 for a predetermined time period.

This routine includes the steps 301 to 310, and is broadly divided into variable initiation steps (steps 301, 302), steps to move the movable vanes in the open direction (steps 303 to 305), steps to move the movable vanes in the closed direction (steps 303, 304, 306 to 308), and steps to count the number of forcible driving times (steps 309, 310).

First, in step 301, the movement number of times counter N is initialized to N=0. Next, in step 302, the number of controls n, an open movement counter Top, and a closure movement counter Tcl are each initialized to zero, the initial value of the movable vanes basic target degree of opening X is set to 100, and the initial value Y[0] of the target degree of opening Y[n] of the movable vanes after rounding is set to zero.

The open movement counter Top is a counter that is incremented by one every time when the movable vanes are moved in the open direction in each control time (see step 305). Also, the closure movement counter Tcl is a counter that is incremented by one every time the movable vanes are moved in the closure direction in each control time (see step 308). The movable vanes basic target degree of opening X is the value along the rectangular wave as shown in FIG. 3, takes the value 100 corresponding to fully open when the movable vanes are moved in the open direction, and takes the value zero corresponding to fully closed when the movable vanes are moved in the closure direction (see step 306). The target degree of opening Y[n] of the movable vanes after rounding is the value corresponding to the waveform obtained by carrying out a rounding process on the rectangular wave of the basic target degree of opening X, as shown in FIG. 3, and is the value of the output signal to the actuator 35 that drives the movable vanes.

Next, in step 303 the number of control times n is incremented just by one (n=0+1), and the target degree of opening Y[n] of the movable vanes after rounding is determined by the following formula.

$$Y[n]=Ka*Y[n-1]+(1-Ka)*X$$

Then a drive signal in accordance with the determined target degree of opening Y[n] after rounding is output to the actuator 35. Incidentally, this formula is the one for a digital low pass filter.

Ka is a predetermined rounding coefficient that can take values in the range from zero to one. When Ka=0, Y[n] is the same as X. As Ka approaches one, the degree of rounding increases; in other word if X is input, as Ka approaches one, the output is delayed further. In the present embodiment, Ka=0.7.

Next, in step 304, the value of the open movement counter Top is compared with a predetermined threshold value (open movement threshold value) Ktop. The open movement threshold value Ktop is a value that regulates continuation time or the number of times of the movable vanes' open direction movement, and in the present embodiment, Ktop=10 (times). In the present step, if the open movement counter Top is less than or equal to the threshold value Ktop, the routine proceeds to step 305, and if the open movement counter Top is greater than the threshold value Ktop, the routine proceeds to step 306.

In step 305, the value of the open movement counter Top is incremented by just one. Then the control routine returns to step 303.

In step 306, the value of the basic target degree of opening X is changed to zero. Then in the next step 307, the value of the closure movement counter Tcl is compared with a predetermined threshold value (closure movement threshold value) Ktcl. The closure movement threshold value Ktcl is also a value similar to the open movement threshold value Ktop, that regulates the continuation time of the movable vanes' closure direction movement, and in the present embodiment, Ktcl=10 (times). In the present step, if the closure movement counter Tcl is less than or equal to the threshold value Ktcl, the routine proceeds to step 308, and if the closure movement counter Tcl is greater than the threshold value Ktcl, the routine proceeds to step 309.

In step 308, the value of the closure movement counter Tcl is incremented by just one. Then the control routine returns to step 303.

In step 309, the value of the movement number of times counter N is compared with the estimated remaining quantity Kn determined and stored in step 104 as shown in FIG. 4. If the value of the movement number of times counter N is less than or equal to the estimated remaining quantity Kn, the routine proceeds to step 310, and if the value of the movement number of times counter N is greater than the estimated remaining quantity Kn, the routine terminates.

In step 310, the value of the movement number of times counter N is incremented just by one. Then the control routine returns to step 302.

Figure 6:
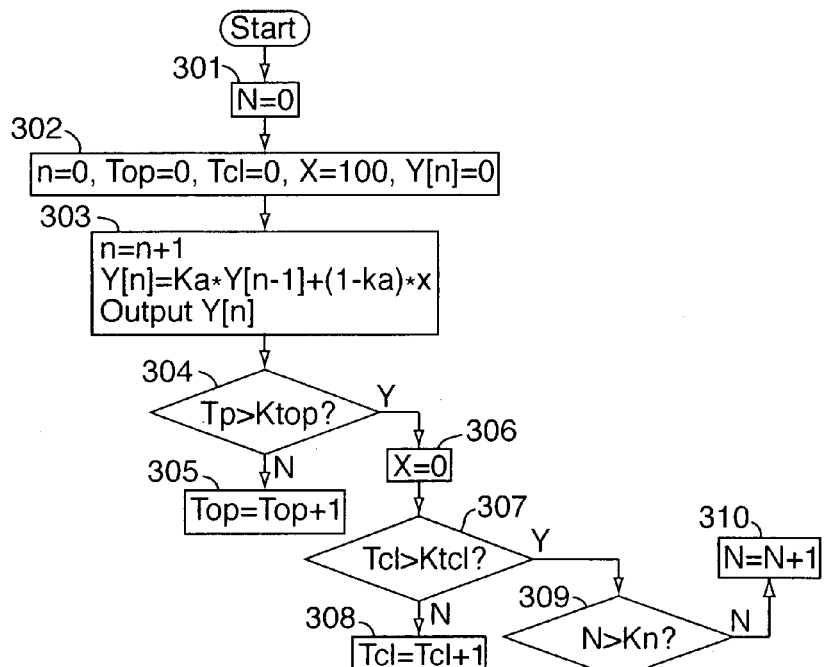
FIG. 6 is a flowchart showing the forced movement execution routine.

The following is an explanation of the movable vanes' forcible opening and closing movement control based on each control routine shown in FIG. 4 to FIG. 6.

When the engine is operated, the estimated remaining quantity Kn is calculated (step 104) by the estimated remaining quantity calculation routine shown in FIG. 4 in each predetermined sample time (in the present embodiment, one minute). Then the estimated remaining quantity Kn is compared with the predetermined threshold value Ks (step 202) by the forcible driving execution determination routine shown in FIG. 5 in every predetermined sample time (in the present embodiment, one minute); if the estimated remaining quantity Kn is greater than the threshold value Ks, the forcible driving is executed (step 203), and the forcible driving execution routine shown in FIG. 6 is executed. In the present embodiment, Ks=3, therefore if the estimated remaining quantity Kn reaches 4 or greater, the forcible driving is executed. The following is an explanation for the case that Kn=4.

As explained in connection with step 201 in FIG. 5, the forcible driving is only executed when the engine operating conditions are in the idling region. This is because if a forcible driving is executed under conditions when the vehicle is running and when the engine operating conditions are outside the idling region, it is difficult to control the supercharge pressure to the desired pressure that is suitable for the engine operating conditions, so it is possible that the vehicle operation will be impeded. In the idling region, it is considered that a vehicle is not positively driven or is stopped in general, so in this case, it is considered that no fault will occur even when the forcible driving is executed.

Also, when the engine operating conditions are in the idling region, if the movable vanes are suddenly given a large forcible driving as shown by X in FIG. 3, the exhaust gas could be adversely affected, and the engine noise will suddenly change which would give the driver a feeling of discomfort. Also, there is a concern with the generation of vibrations due to the fluctuation in rotation. Therefore in the present embodiment, the rounding process is carried out at step 303 of FIG. 6, so that the movable vanes are forcibly moved comparatively gently as shown by Y[n] in FIG. 3.

In the execution of the routine shown in FIG. 6, the initial control time immediately after starting execution of the routine, n=0+1=1 (first time) and Y[1]=0.7*0+(1−0.7)*100=30 (see FIG. 3) in step 303. Then Y[1]=30 is output to the actuator 35 that moves the movable vanes, and the movable vanes are controlled to the degree of opening according to this value.

In the next step 304, Ktop is set in advance to 10, and Top is still the initial value zero at this point, so the result of the determination is NO, the routine proceeds to step 305, the value of Top is incremented just by one, so Top=1. Then, when the next control timing is reached after a predetermined crank angle period, the step 303 is again executed, n=2, Y[2]=0.7*30+(1−0.7)*100=51 (see FIG. 3), and Y[2]=51 is output to the actuator 35 that moves the movable vanes. In the next step 304, Top is one at this point, so the result of the determination is still NO, the routine proceeds to step 305, the value of Top is incremented just by one, so Top=2.

In this way, every time the forcible driving in the open direction is completed, Top is incremented just by one, and the forcible driving in the open direction is continued until the value of Top exceeds the value of Ktop, in other words, Top=11. In the $3^{rd}$ to $11^{th}$ controls, Y[3]=66, Y[4]=76, Y[5]=83, Y[6]=88, Y[7]=92, Y[8]=94, Y[9]=96, Y[10]=97, Y[11]=98, and each of these values are output at their respective control timings (see FIG. 3). Then step 304 is reached after the $11^{th}$ output is completed, and the result of the determination becomes YES, and the routine proceeds to step 306, in other word to control in the closure direction.

In step 306, the value of X is changed to zero. Then in the next step 307, Ktcl=10, and as Tcl is still the initial value, zero at this point, the result of the determination is NO, the routine proceeds to step 308, and the value of Tcl is changed to one. Then when the timing of the next control is reached, step 303 is executed again, n=12, Y[12]=0.7*98+(1−0.7)*0=69 (see FIG. 3), and Y[12]=69 is output to the actuator 35 that moves the movable vanes. In the next step 304, Top=11 is sustained, so the result of the determination is YES, and the routine proceeds to step 306.

In step 306, X is made equal to zero again, then the routine proceeds to step 307. At this point Tcl=1, which does not exceed Ktcl=10, so the result of the determination is NO, the routine proceeds to step 308, and Tcl=1+1=2. Then, when the timing of the next control is reached, step 303 is again executed, n=13, Y[13]=0.7*69+(1−0.7)*0=48 (see FIG. 3), so Y[13]=48 is output to the actuator 35 that moves the movable vanes. In the next step 304, Top=11 is still sustained, so the result of the determination is YES, and the routine proceeds to step 306.

In this way, every time that the forcible driving in the closure direction is completed, Tcl is incremented just by one, and the forcible driving in the closure direction is continued until the value of Tcl exceeds the value of Ktcl, in other words Tcl=11. In the $14^{th}$ to $22^{nd}$ controls, Y[14]=34, Y[15]=24, Y[16]=17, Y[17]=12, Y[18]=8, Y[19]=6, Y[20]=4, Y[21]=3, and Y[22]=2 are output respectively (see FIG. 3). Then step 307 is reached after the $22^{nd}$ output is completed, and the result of the determination becomes YES, and the routine proceeds to step 309.

In step 309, the value of the movement number of times counter N is compared with the value of the estimated remaining quantity Kn=4. At this point the initial value of N=0 of step 301 is still maintained, so the result of the determination is NO, the routine proceeds to step 310, and the movement number of times counter is incremented just by one so that N=1. This means that the first forcible driving that includes outputting Y[1] to Y[22] is completed. Then the control routine returns to step 302, and outputting of Y[1] to Y[22] is again executed as described above.

After outputting of Y[22] of the second forcible driving is completed, when step 309 is reached, and the result of the determination is NO as N=1. Therefore, the routine proceeds to step 310, N=1+1=2 (in other words, the second forcible driving is completed), the routine proceeds to step 302, and the third forcible driving is started.

This forcible driving is repeated a total of five times. In other words, after outputting Y[22] in the $5^{th}$ forcible driving is completed, step 309 is reached, so the result of the determination is YES as N=5, Kn=4. In this way the routine is terminated, and the movable vane forcible drive control terminates.

As explained above, according to the present invention, the deposition quantity and burn off quantity of soot in accordance with the engine operating conditions are taken into account. In this respect, the present invention clearly differs from Patent Document 1 which does not take account of soot burn off. Also, the remaining quantity of soot is calculated based on these values while the engine is operated, so only when the remaining quantity of soot is equal to or greater than a predetermined amount is the movable vanes forcible driving executed. Therefore, wasteful forcible driving is not carried out, and it is possible to execute the forcible driving at appropriate timing. Also, the greater the remaining quantity of soot, it is possible to execute the forcible driving more times (in other words, for longer time), so the forcible driving can be executed a sufficient number of times (in other words, length of time) corresponding to the remaining quantity of soot. Therefore, according to the present invention, appropriate and efficient forcible drive control is achieved.

Also, the estimated deposition quantity of soot is set to be large in the engine operating region (low rotation speed, low load region) in which deposition of soot is comparatively easy, and conversely the estimated burn off quantity of soot is set to be large in the engine operating region (high rotation speed, high load region) in which soot deposition is comparatively difficult, so the estimated remaining quantity is obtained in accordance with the actual engine operating conditions, which can make a remarkable contribution to the execution of appropriate forcible driving. In other words, in cases where an engine is operated mostly, at low speed and low load, such as in a vehicle that runs continuously at low speed in a city or the like, in a relatively short period of time the estimated remaining quantity Kn can exceed the threshold value Ks, so the forcible driving can be carried out at relatively short intervals. Conversely, in cases where an engine is operated mostly at high speed and high load, such as in a vehicle that is mainly run at high speed, it is difficult for the estimated remaining quantity Kn to exceed the threshold value Ks, so the forcible driving can be carried out at relatively long time intervals. Reducing the frequency of forcible driving causes no problem because when the engine is run at high speed and high load, exhaust gas at high temperature and at a high flow rate strikes near the movable parts of the variable capacity mechanism, so soot deposition is difficult and burn off can easily occur.

In particular, according to the present invention, for many vehicles that have very diverse usage, it is possible to carry out forcible driving that is appropriate for each vehicle. In other words, for engines that are frequently used for low speed low load operation, the remaining quantity of soot in a sample time (in the present embodiment, one minute) tends to increase, but in the present invention in this case the frequency (timing) and number of forcible driving can be increased. Conversely, for engines that are frequently used for high speed and high load operation, the remaining quantity of soot in the sample time tends to be small, but in the present invention in this case the frequency and number of forcible driving can be reduced.

Forcible driving is carried out in the idling region in order to not affect the running of the vehicle. At this time, the degree of opening of the vanes is varied comparatively gently, in accordance with the waveform after the rounding process. Therefore, during the forcible driving, the exhaust gas can be affected as little as possible, sudden changes in the engine noises can be prevented, and discomfort for the driver can be minimized as little as possible.

Many embodiments of the present invention apart from the embodiment described above are possible.

In the embodiment described above, each of the numerical values and units were examples, and it is possible to arbitrarily select numerical values or units as necessary. The estimated deposition quantity and the estimated burn off quantity were calculated in the above embodiments using the maps in FIG. 7 to FIG. 10, however the quantities may be calculated from calculation formulae. In the above embodiments, the units of the estimated deposition quantity, the estimated burn off quantity, and the estimated remaining quantity were the number of times of the forcible driving, but normal units of quantity (for example, cc) may be used. Also, the units of number of times may be converted into units of time, and units of time may also be converted into units of crank angle, so the converse is also possible.

In the above embodiments, the three parameters that express the engine operating conditions were engine rotation speed, engine load, and engine temperature. However, any one or more parameters that are related to the deposition and burn off of soot may be adopted. For example, only one or two of the above three parameters may be used, or other parameters such as inlet air temperature, supercharge pressure, or the like, may be used. In the above embodiments, the accelerator degree of opening was used as the engine load, but the required torque or the target fuel injection quantity may be used. Oil temperature may also be used as the engine temperature.

Various possibilities can be considered for the actuator 35 that moves the movable vanes in the above embodiments. For example, positive or negative air or oil pressure can be generated by a pump driven by the engine, and these air or oil pressures can be used as the drive source for the actuation. Also, an electrically operated actuator is possible, and if this is used, the movable vanes can be driven electrically while the engine is stopped when a pump cannot be driven, so it is possible to carry out the movable vanes forcible driving while the engine is stopped when the engine operation will not be affected.

In the above embodiment, the movable vanes forcible driving was executed counting a movement of the movable vanes moved once each in the open direction and in the closure direction as a single movement pattern. However, various types of patterns may be adopted for the forcible driving. A movement may consist of at least only once in the open direction or only once in the closure direction. Or conversely, the number of movements in the open direction and/or in the closure direction may be increased. A pattern in which movements in the open direction and the closure direction are repeated alternately twice or more may be counted as one movement.

In the above embodiment, one movement was not a complete return pattern (in other words, the degree of opening at the start time (Y[1]) and the degree of opening at the completion time (Y[22]) are different). However, a complete return pattern is also possible. For example, a pattern such as a sine curve is possible. In the above embodiment, the movement was in accordance with the rounded waveform (Y[n]), but movement in accordance with a rectangular wave (X) may also be used.

Also, various opening and closing stroke ranges of the movable vanes are possible. In the above embodiment, the stroke was between almost fully open and almost fully closed, but it is possible to select various ranges, such as between fully open and fully closed, fully closed and an intermediate degree of opening, and so on.

Various types of turbocharger variable capacity mechanisms besides the one in the above embodiments may be applied. Also, the engine is not limited to a diesel engine, and is not limited to a vehicle engine.

While the present invention has been illustrated and described with respect to a particular embodiment thereof, it should be appreciated by those of ordinary skill in the art that various modifications to this invention may be made without departing from the spirit and scope of the present invention.

What is claimed is:

1. An engine control device in an engine having a turbocharger having a variable capacity mechanism that includes a movable vane, comprising:

first storage means that stores the quantity of soot estimated to be deposited near a movable part of the variable capacity mechanism, determined in advance in accordance with a value of a parameter expressing an engine operating condition;

second storage means that stores the quantity of soot estimated to be burnt off from near the movable part, determined in advance in accordance with the value of the parameter;

measurement means that measures an actual value of the parameter;

first determination means that determines an estimated deposition quantity and an estimated burn off quantity of soot corresponding to the measured values of the parameter, from the first storage means and the second storage means;

second determination means that determines an estimated remaining quantity of soot by obtaining the difference between the determined estimated deposition quantity and the determined estimated burn off quantity; and drive means that forcibly drives the movable vane to open and close in accordance with the determined estimated remaining quantity.

2. The engine control device according to claim 1, wherein the parameter includes at least one of an engine rotation speed, an engine load, and an engine temperature.

3. The engine control device according to claim 1, wherein the parameter is an engine rotation speed, and the estimated deposition quantity becomes smaller as the engine rotation speed increases, and the estimated burn off quantity increases as the engine rotation speed increases.

4. The engine control device according to claim 1, wherein the parameter is an engine load, and the estimated deposition quantity becomes smaller as the engine load increases, and the estimated burn off quantity increases as the engine load increases.

5. The engine control device according to claim 1, wherein the parameter is an engine temperature, and the estimated deposition quantity becomes smaller as the engine temperature increases, and the estimated burn off quantity increases as the engine temperature increases.

6. The engine control device according to claim 1, further comprising comparison means that compares the estimated remaining quantity with a predetermined threshold value, and when the estimated remaining quantity is greater than the predetermined value, the drive means forcibly drives the movable vane for a period of time corresponding to the estimated remaining quantity.

7. The engine control device according to claim 1, wherein the drive means executes forcible driving of the movable vane with a pattern of moving the movable vane in an open direction and a closure direction at least once each, as one drive.

8. The engine control device according to claim 7, wherein the estimated deposition quantity, the estimated burn off quantity, and the estimated remaining quantity have the units of number of times of the forcible driving.

9. The engine control device according to claim 1, wherein the drive means comprises third determination means that determines a target degree of opening of the movable vane, and the determined target degree of opening has a value corresponding to a waveform that is obtained after applying a rounding process to a rectangular wave with respect to a time axis.

10. The engine control device according to claim 1, wherein the drive means executes the forcible driving when the engine operating condition is in an idling region.

* * * * *